US012613952B2

(12) United States Patent
Sharma et al.

(10) Patent No.: US 12,613,952 B2
(45) Date of Patent: *Apr. 28, 2026

(54) ENHANCED CONSUMER DEVICE VALIDATION

(71) Applicant: Visa International Service Association, San Francisco, CA (US)

(72) Inventors: Sanjeev Sharma, Sunnyvale, CA (US); Manjush Menon, San Ramon, CA (US); Dmitri Bannikov, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/894,668

(22) Filed: Sep. 24, 2024

(65) Prior Publication Data

US 2025/0013731 A1 Jan. 9, 2025

Related U.S. Application Data

(63) Continuation of application No. 16/826,872, filed on Mar. 23, 2020, now Pat. No. 12,105,789.

(60) Provisional application No. 62/824,796, filed on Mar. 27, 2019.

(51) Int. Cl.
| | |
|---|---|
| *G06F 21/44* | (2013.01) |
| *G06Q 20/36* | (2012.01) |
| *G06Q 20/40* | (2012.01) |

(52) U.S. Cl.
CPC ........... *G06F 21/44* (2013.01); *G06Q 20/363* (2013.01); *G06Q 20/4012* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 6,327,578 | B1 * | 12/2001 | Linehan | ................. G06Q 20/02 |
| | | | | 713/172 |
| 8,250,632 | B1 * | 8/2012 | Staddon | .............. G06F 16/9535 |
| | | | | 726/4 |
| 8,533,118 | B2 | 9/2013 | Weller et al. | |
| 8,533,791 | B2 * | 9/2013 | Samuelsson | .......... H04L 9/3231 |
| | | | | 726/5 |

(Continued)

FOREIGN PATENT DOCUMENTS

| | | | | |
|---|---|---|---|---|
| CN | 105659558 A | 6/2016 | | |
| EP | 2610775 A2 * | 7/2013 | ........... | H04L 9/3271 |
| WO | WO-2025064500 A1 * | 3/2025 | ........... | H04L 9/3247 |

*Primary Examiner* — Jahed Ali
(74) *Attorney, Agent, or Firm* — K&L Gates LLP

(57) ABSTRACT

Unknown devices may be bound to an identity using a four step process that involves trusted relationships only between known partner entities and a known user attribute. The identity may be an account, such as a personal account number (PAN). The PAN may be abstracted using a token for use with the device. The unknown device may first be enrolled at a service to establish a cryptographically verifiable identity. A binding request for the enrolled device may be sent to an issuer of the PAN resulting in the issuer generating a challenge. After a successful authentication of the challenge at the token service provider, the binding of the token to the device is complete.

20 Claims, 5 Drawing Sheets

(56) References Cited

U.S. PATENT DOCUMENTS

| | | | |
|---|---|---|---|
| 9,240,011 B2 | 1/2016 | Fuerstenberg et al. | |
| 9,270,454 B2 | 2/2016 | Maruti et al. | |
| 9,363,259 B2 | 6/2016 | Chenna | |
| 9,860,067 B2* | 1/2018 | Piqueras Jover | H04L 9/3247 |
| 9,942,043 B2 | 4/2018 | Palanisamy | |
| 9,978,062 B2 | 5/2018 | Raj et al. | |
| 10,003,459 B2* | 6/2018 | Suzuki | H04L 9/0861 |
| 10,097,546 B2* | 10/2018 | Hao | H04L 63/107 |
| 10,255,456 B2 | 4/2019 | Guglani et al. | |
| 10,284,422 B2 | 5/2019 | Frankel et al. | |
| 10,496,986 B2 | 12/2019 | Narayan et al. | |
| 10,810,585 B2 | 10/2020 | Kadiwala et al. | |
| 10,848,304 B2 | 11/2020 | Chumbley | |
| 10,878,407 B1* | 12/2020 | Spector | G06Q 20/405 |
| 10,878,411 B2 | 12/2020 | Ko et al. | |
| 10,878,424 B2 | 12/2020 | Tetali et al. | |
| 10,909,539 B2* | 2/2021 | Fisher | G06Q 20/40145 |
| 10,911,429 B2 | 2/2021 | Law et al. | |
| 10,984,117 B2 | 4/2021 | Shankar et al. | |
| 11,062,302 B1* | 7/2021 | Ho | G06Q 20/3672 |
| 11,188,897 B2 | 11/2021 | Kurian | |
| 11,210,670 B2 | 12/2021 | Loganathan et al. | |
| 11,232,435 B2 | 1/2022 | Musil et al. | |
| 11,323,443 B2 | 5/2022 | Kang et al. | |
| 11,494,768 B2 | 11/2022 | Abouelenin | |
| 11,544,703 B2 | 1/2023 | Cho et al. | |
| 11,580,519 B2 | 2/2023 | Prakash et al. | |
| 11,593,801 B1* | 2/2023 | Dietrich | G06Q 20/405 |
| 11,615,395 B2 | 3/2023 | McHugh et al. | |
| 11,669,594 B2 | 6/2023 | Gibb | |
| 11,777,934 B2 | 10/2023 | Fuhrmann et al. | |
| 11,847,233 B2 | 12/2023 | Shankar et al. | |
| 11,887,080 B2 | 1/2024 | Royyuru et al. | |
| 12,063,513 B2 | 8/2024 | Byington et al. | |
| 12,079,891 B2 | 9/2024 | Lougheed, III et al. | |
| 2006/0259445 A1* | 11/2006 | Chatte | G06Q 20/322 |
| | | | 705/408 |
| 2010/0114776 A1* | 5/2010 | Weller | G06Q 20/4016 |
| | | | 705/325 |
| 2013/0024307 A1* | 1/2013 | Fuerstenberg | G06Q 20/386 |
| | | | 705/18 |
| 2014/0068252 A1* | 3/2014 | Maruti | H04L 9/0866 |
| | | | 713/162 |
| 2014/0344153 A1* | 11/2014 | Raj | G06Q 20/385 |
| | | | 705/44 |
| 2014/0351589 A1* | 11/2014 | Chenna | H04W 12/068 |
| | | | 713/168 |
| 2015/0046338 A1* | 2/2015 | Laxminarayanan | G06Q 20/20 |
| | | | 705/67 |
| 2015/0220917 A1* | 8/2015 | Aabye | G06Q 20/3278 |
| | | | 705/64 |
| 2015/0278799 A1* | 10/2015 | Palanisamy | G06Q 20/385 |
| | | | 705/76 |
| 2015/0312038 A1* | 10/2015 | Palanisamy | G06Q 20/385 |
| | | | 713/155 |
| 2016/0092696 A1* | 3/2016 | Guglani | G06F 21/606 |
| | | | 726/26 |
| 2016/0127179 A1* | 5/2016 | Frankel | H04L 41/0806 |
| | | | 709/220 |
| 2016/0171479 A1* | 6/2016 | Prakash | G06F 21/44 |
| | | | 726/1 |
| 2016/0335626 A1* | 11/2016 | Ko | G06Q 20/06 |
| 2017/0032362 A1* | 2/2017 | Lahkar | G06Q 20/3674 |
| 2017/0163629 A1* | 6/2017 | Law | H04L 63/0823 |
| 2017/0352026 A1* | 12/2017 | Musil | G06Q 20/382 |
| 2018/0247312 A1* | 8/2018 | Loganathan | G06Q 20/4014 |
| 2018/0254898 A1* | 9/2018 | Sprague | H04L 9/0637 |
| 2018/0276657 A1* | 9/2018 | Cho | G06Q 20/3223 |
| 2018/0293579 A1* | 10/2018 | Tetali | G06Q 20/3674 |
| 2019/0205867 A1* | 7/2019 | Radu | G06Q 20/3674 |
| 2019/0251552 A1* | 8/2019 | Kurian | H04L 9/3247 |
| 2019/0311354 A1* | 10/2019 | Kulkarni | G06Q 20/401 |
| 2020/0012798 A1* | 1/2020 | Shankar | G06F 21/335 |
| 2020/0013051 A1* | 1/2020 | Kadiwala | H04L 63/068 |
| 2020/0027116 A1* | 1/2020 | Royyuru | G06Q 30/0233 |
| 2020/0028679 A1* | 1/2020 | Chumbley | H04L 9/0894 |
| 2020/0134626 A1* | 4/2020 | Abouelenin | H04L 63/0876 |
| 2020/0154270 A1* | 5/2020 | Byington | G06F 8/30 |
| 2020/0220726 A1* | 7/2020 | Lougheed, III | G06F 16/211 |
| 2020/0242212 A1* | 7/2020 | Gibb | H04L 63/10 |
| 2020/0267153 A1* | 8/2020 | Kang | H04L 63/10 |
| 2020/0311246 A1* | 10/2020 | Sharma | G06F 21/602 |
| 2021/0192060 A1* | 6/2021 | Shankar | G06Q 20/3825 |
| 2021/0192519 A1* | 6/2021 | Mchugh | G06Q 20/352 |
| 2021/0279699 A1* | 9/2021 | Royyuru | G06Q 20/363 |
| 2021/0320922 A1* | 10/2021 | Furhmann | G06F 21/33 |

* cited by examiner

40

60

400

ENHANCED CONSUMER DEVICE VALIDATION

CROSS-REFERENCE TO RELATED APPLICATIONS

This application is a continuation application claiming priority under 35 U.S.C. § 120 to U.S. patent application Ser. No. 16/826,872, filed Mar. 23, 2020, entitled ENHANCED CONSUMER DEVICE VALIDATION, which claims benefit under 35 U.S.C. § 119 (e) to U.S. Provisional Patent Application No. 62/824,796 filed Mar. 27, 2019, entitled ENHANCED CONSUMER DEVICE VALIDATION, the entire disclosures of which are hereby incorporated by reference herein.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An individual has never had more choices for presenting his or her identity in an arm's length interaction. That is, in a social media interaction, when traveling, or in a consumer transaction, the individual may confirm their identity using a variety of instruments such as a photo identification card, a financial institution card, a cell phone, a tablet, a smartwatch, or other personal device. In many cases, the individual may want each instrument to have its own separate identity but for each to ultimately be bound to the individual. A driver's license has this identity bound by the state issuing the license from a secure facility, but creating this binding on a generic consumer device after the device is in public use is problematic.

SUMMARY

In an embodiment, a process for binding a consumer identity to a device involves a separate device enrollment and device authentication using an out-of-band challenge process that allows the device to be bound to an identity of the owner/user. In the case of a financial instrument, a token representing the actual financial instrument may be used as the identification reference. An issuer and the token service provider are assumed to have a trusted relationship, at least at the level of shared cryptographic keys.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Electronic devices capable of directed actions on behalf of a user are proliferating. Purchases may be made not just from computers/laptops or cell phones, but from watches, smart speakers, automobiles, refrigerators, and more. In the case of some devices, keys installed at the time of manufacture or sale allow specific trust relationships to be established with specific endpoints, such as a cell phone service provider. However, establishing trust with other third parties that are not provisioned in a device prior to delivery to a user can be more difficult. As a specific example, how can a credit card issuer bind a financial instrument to someone's refrigerator so that the issuer has an assurance that the appliance is acting on behalf of the owner of the financial instrument. In other words, there is a desire to validate that the financial instrument owner is tied to the device in question.

The system and methods described here allow such a binding to occur for various use cases and require only minimal prerequisites such as a relationship between the issuer and the user/card holder as well as a trust relationship between the issuer and a token service provider. A wallet account and associated wallet application may be participants in the process. An issuer application on the user's device may also be a participant in some use cases.

Figure 1:
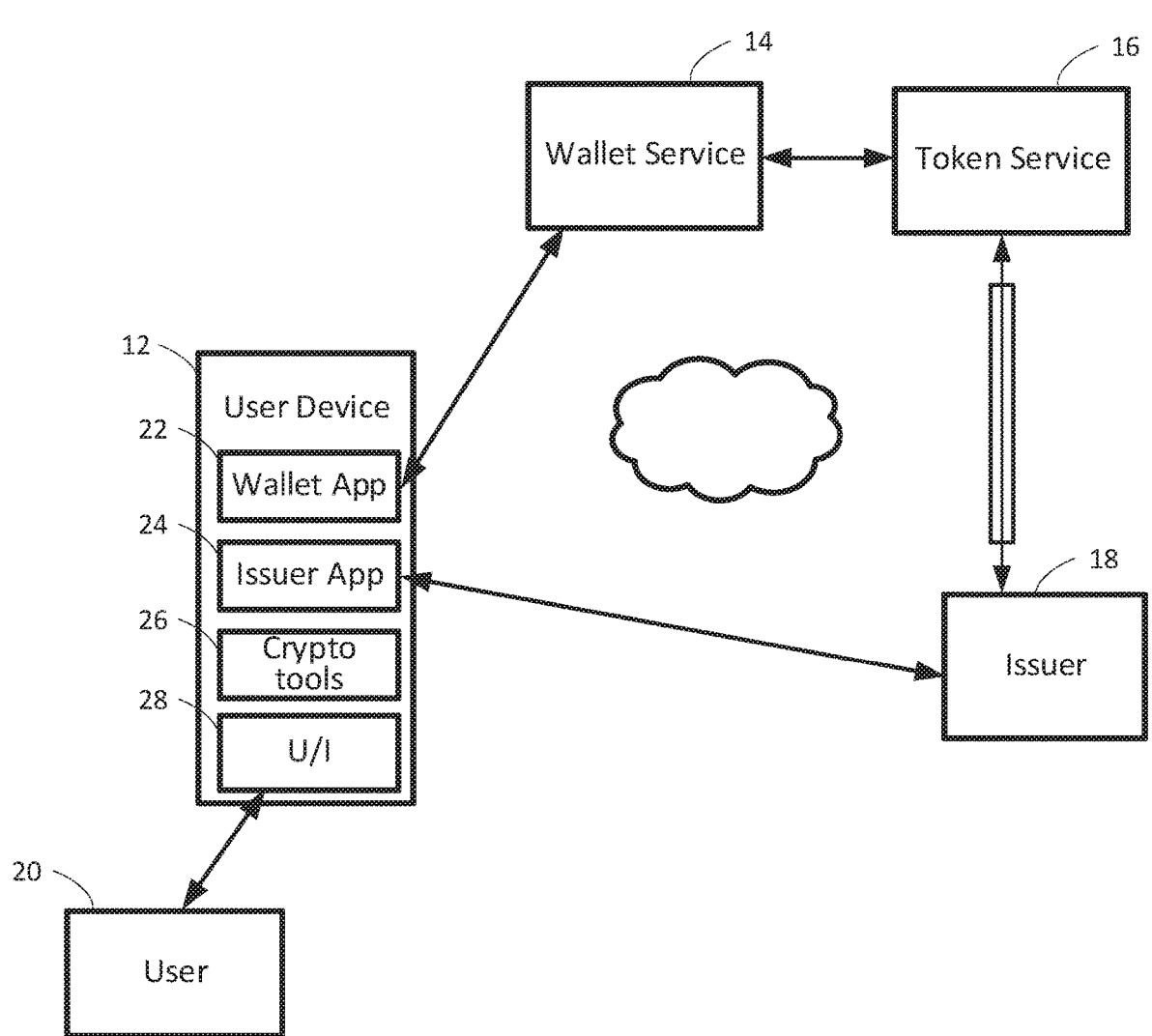
FIG. 1 is a block diagram of a system supporting enhanced consumer device validation in accordance with the current disclosure.

For the following discussion, a smart phone binding to a personal account of the user will be used for the sake of simplicity and clarity. Turning to FIG. 1, a block diagram of a system 10 illustrates exemplary participants in the enhanced consumer device validation process. A user device 12 may be in communication with a wallet service 14 and an issuer 18. A token service provider 16 may be in communication with the wallet service 14 and the issuer 18. The token service provider 16 may act as a service to generate tokens and maintain an association between the generated token and the actual personal account number (PAN) of the user 20.

The connection between the token service provider 16 and the issuer 18 may be secure and/or involve shared keys between the two entities. Either asymmetric or symmetric keys may be used with slightly different processes. A user 20 may be in communication with the user device 12. In several use cases, the participation of the user 20 may involve selection of a contact method as well as relaying a challenge response. The various communication channels may include public and private networks. The steps described below reduce the risk of eavesdropping and man-in-the-middle attacks while allowing device binding with minimal relationship assumptions.

The user device 12 may have installed and available a wallet application 22 that corresponds with the wallet service 14. The wallet application may store credentials for the user such as account data, address information, etc. The wallet application may have access to or separately contain cryptographic tools 26. While in communication with the wallet service 14, the wallet application 22 may have access to purchase histories, special promotions, and account maintenance features. An issuer application 24 may be in communication with the issuer 18. The issuer application 24 may allow the user 20 to view accounts, transfer funds, pay bills, etc., via its connection with the issuer 18. Cryptographic tools 26 may allow the user device 12 to perform basic cryptographic functions including key generation, signing, signature verification, and encryption/decryption. A user interface 28 may include a display and keyboard or touchscreen that allows presentation of data to the user 20 and allows the user to input data and make selections.

Figure 2:
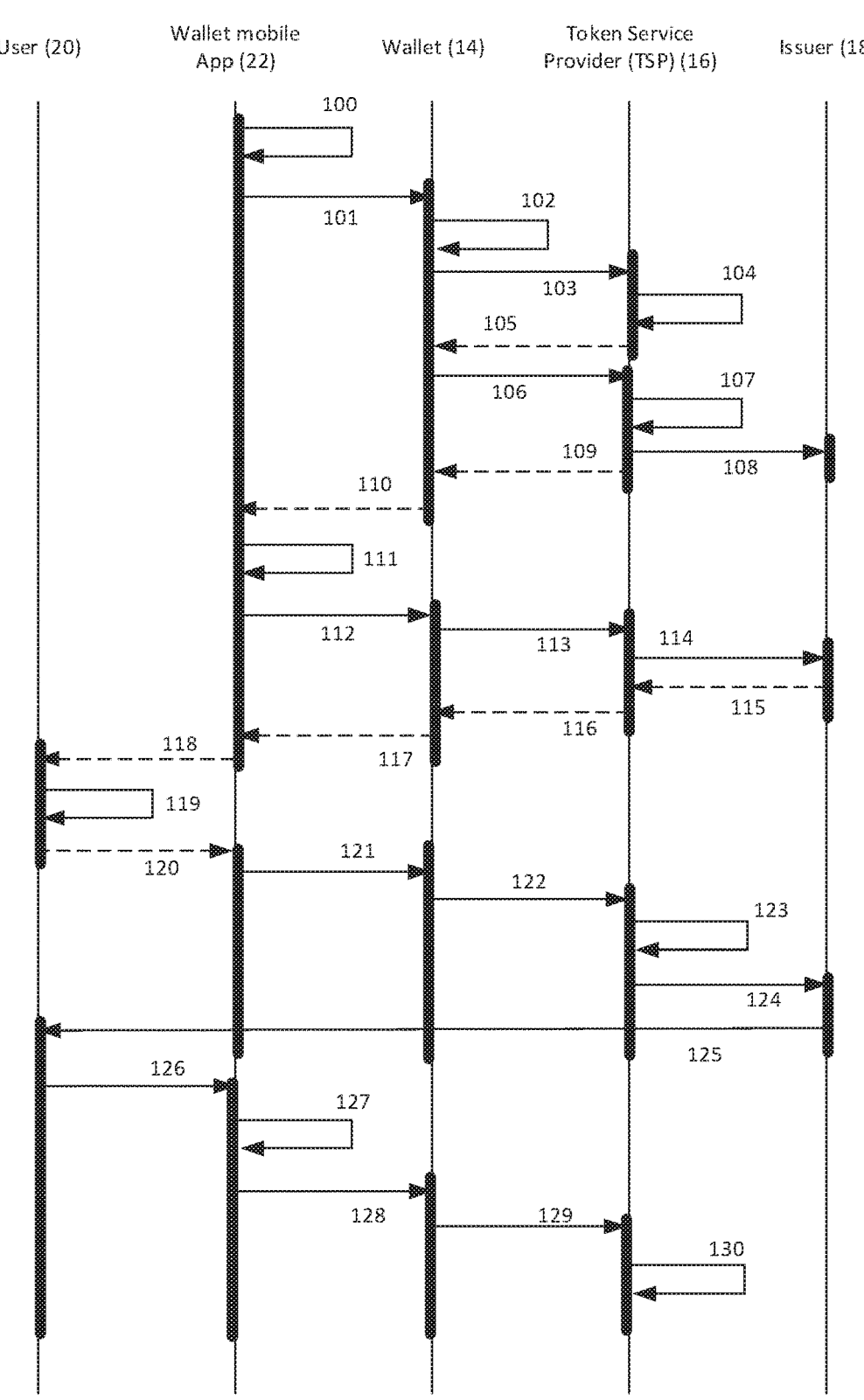
FIG. 2 is a sequence diagram illustrating a first use case of enhanced consumer device validation.

FIG. 2 illustrates a sequence diagram 40 for a first use case of the enhanced consumer device validation process.

This use case is directed to a process using contact with the user 20 via an out-of-band text message, email, or other communication.

Enroll Device

In step 100 the wallet app 22 generates key pairs: one for authentication key (K_DID) and one for transport key K_TR (optional). K_DID may be used for device authentication. K_TR may be needed if ever there is a need for the token service 16 to send secure payload to the device 12 so wallet service 14 can't decrypt it. The keys are passed to the wallet service 14 at step 102 along with a device identifier (ID) of the device 12. In this discussion, key.PK is a public key, and key.SK is a secret key of an asymmetric (PKI) key pair.

In a prior art process similar to this, the wallet service 14 creates certificates for the two keys (K_DID.PK and K_TR.PK). In this case, it's not needed. Instead, the wallet app 22 creates a certificate: sign K_TR.PK with K_DID.SK. K_DID does not need a certificate. The wallet service 14 sends a request to enroll the device 12 to the token service 16 at step 103.

In step 104, the token service 16 links the device_id to K_DID.PK (and optionally K_TR.PK). If K_TR.PK comes in the request, it shall come in the form of the certificate. The token service 16 validates the signature using K_DID.PK. K_DID is not being validated at this point. A response is sent back to the wallet service 14 at step 105.

At step 106, the wallet service 14 encrypts a payload including user PAN data with the token service public key. The token service 16 creates the requested token at step 107 and forwards the token to the issuer 18 at step 108 as well as sending the token ID (TokenID) to the wallet service 14 at step 109 which then forwards that to the wallet app 22 at step 110.

Binding Request

At steps 111-113, device binding is initiated with a device signed binding request (device_id, TokenID, nonce, client_reference, timestamp) with K_DID.SK. At step 114, the token service 16 validates the signature using K_DID.PK and forwards the request to the issuer 18.

Challenge

The issuer 18 initiates a process a step up authentication that requires the user provide additional proof as being a party to the current process. In an embodiment, the issuer may request a channel by which the issuer can send a challenge. In some cases, the choices may be a mobile device number to which a text message can be sent or an email account to which an email can be sent. The step up options may be masked so that the user would know what is being referred to but the intermediary handlers will not recognize the choices. For example, a message may include "send to xxx-xxx-0785" or "email xxx38@gmail.com." After relaying the message through steps 115, 116, and 117, at step 118 the user may be presented with the choices at which to receive the challenge. At step 119, the user may make a selection.

At step 121 the wallet app 22 signs a payload with K_DID.SK. The payload may include the device_id, nonce, client_reference, timestamp, etc. At step 122 an application program interface may allow submission of the payload to the token service 16. The token service 16 may validate the signature using K_DID.PK and generate a one-time passcode "otpValue" at step 123. At step 124 the otpValue may be shared with the issuer 18 so that the issuer can contact the user 20 via the selected contact mechanism and pass the otpValue to the user at step 125. At step 126 the user 20 enters the otpValue into the wallet app 22. In another embodiment, the wallet app 22 may get the value directly from the SMS text message.

Authentication

At step 127, the device gets the otpValue, creates payload consisting of the otpValue and a portion of K_DID.PK, and encrypts the result with the public key of the token service 16 and signs it with K_DID. The encrypted, signed payload is sent to the wallet service 14 at step 128 and is forwarded to the token service 16 at step 129.

At step 130, the token service 16 validates the signature using K_DID.PK, decrypts the payload using the token service secret key (SK), and then validates that the payload contains a portion of the same key, K_DID.PK, used for signature validation. This ensures the same entity that encrypted the payload signed it, so the encrypted payload can't be stolen, signed and submitted for verification by an adversary. If the signature is correct for a given device and the otpValue matches the one that was generated for a given client, the challenge is successful and the binding is complete. Exemplary computer instructions for performing step 130 is provided below:

```
public OtpValueBO decryptEncOtpValue(StepUpVerificationRequestBO
requestBO) throws CbpProcessingException {
        if (requestBO == null || StringUtils.isBlank(requestBO.getEncOtpValue( ))) {
                // encOtpValue is an optional field
                return null;
        }
        TokenInfoBO tokenInfoBO = requestBO.getTokenInfo( );
        DMSMessageBO dmsMessageBO =
dmsMessageService.getDeviceCertificatesAndProfile(tokenInfoBO.getDigitalWall
etID( ), tokenInfoBO.getDeviceId( ));
        OtpValueBO otpValueBO =
encryptionService.verifySignatureAndDecryptRSA(requestBO.getEncOtpValue( ),
dmsMessageBO, OtpValueBO.class);
        if
(!featureToggleService.isFeatureEnabled(FeatureToggleFlags.validateEncOtpDi
sabled)
                && otpValueBO != null) {
        encryptionService.validateCertIdAgainstDeviceCert(dmsMessageBO.getC
ertificateFromDeviceCerts(CertUsage.INTEGRITY.getValue( )),
otpValueBO.getCertID( ));
        }
        return otpValueBO;
}
```

Figure 3:
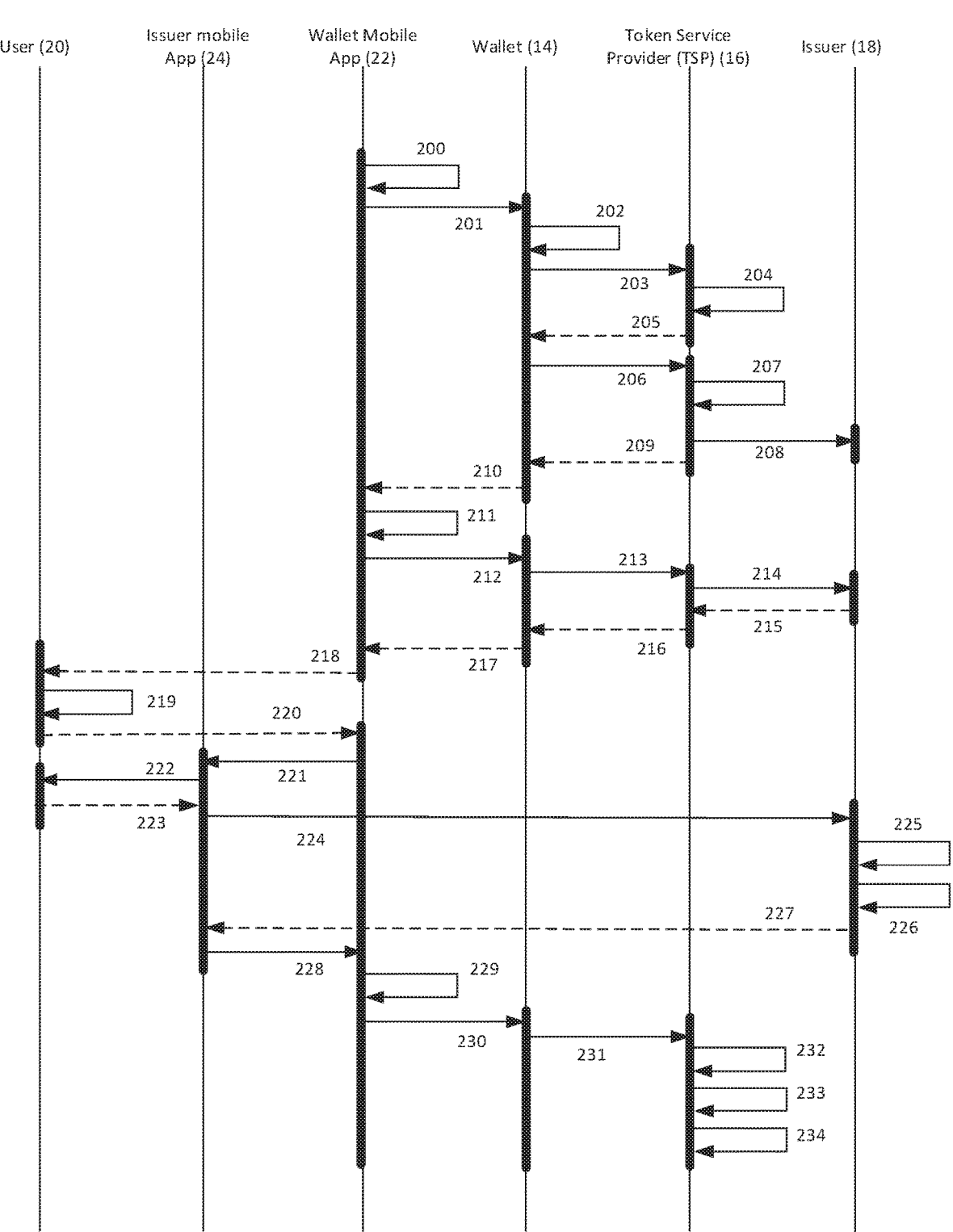
FIG. 3 is another sequence diagram illustrating a first use case of enhanced consumer device validation.

FIG. 3 illustrates a second use case of enhanced consumer device validation involving communication between the issuer app 24 and the wallet app 22 on the user device 12. Steps 200-220 correspond with steps 100-120 of the previous example. At step 221, the wallet app 22 may authenticate to the issuer app 24, and at steps 222-223 the issuer app 24 may authenticate the user using a previously established protocol. Then, step 224 may include the issuer app 24 sending a request for payload to the issuer 16. The issuer 16 may create a payload including the PAN, an authcode, and a date at step 225. At step 226 the issuer 18 encrypts the payload with key shared between issuer 18 and the token service 16, which wallet service 14 does not have. At step 229 the wallet app 22 may receive the payload, sign it with K_DID.SK and encrypt the result with the token service public key and sends it to the wallet service 14 at step 230.

Step 231 involves the wallet service 14 validating the wallet app signature, which is a gating activity to sending the rest of the payload to the token service. Step 232 has the token service 16 validate the device signature and at step 233 decrypts the payload with the issuer key. The issuer key is not in the possession of the wallet service 14. When the payload decrypts into a recognized format, at step 234, the token service 16 checks the authorization code for correctness of form and format to complete the authentication process. The actual value of the authentication code may not need to be validated because the other signature and decryption steps create enough trust that the user may be bound to the device.

Figure 4:
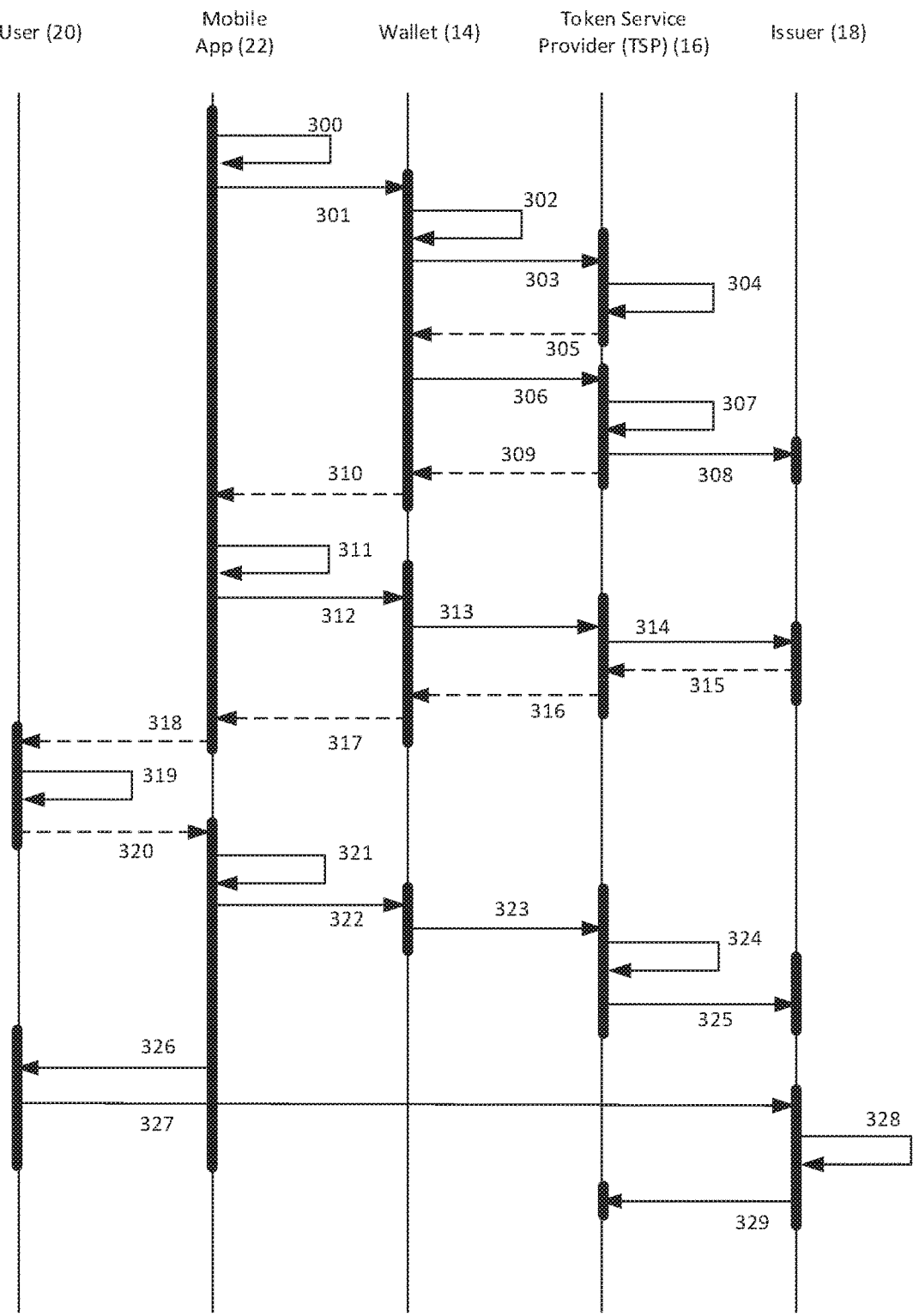
FIG. 4 is yet another sequence diagram illustrating a first use case of enhanced consumer device validation.

FIG. 4 illustrates another use case similar to that of FIG. 2. In this exemplary case, the user may contact the issuer out of band to complete the challenge.

As above, steps 300-320 correspond to steps 100-120 of the process illustrated in FIG. 2. At step 321, the wallet generates a one-time passcode optValue and signs it with K_DID.SK, and encrypts the result with the token service public key. This payload is sent to the wallet service 14 at step 322 and forwarded to the token service at step 323. The token service 16 decrypts the otpValue using the wallet service key and re-encrypts the otpValue with the issuer key at step 324. At step 325 the token service 16 sends the encrypted otpValue to the issuer, where the issuer decrypts and stores the optValue for a subsequent step.

The wallet app 22 may show the otpValue to the user via the user interface 28 at step 326. The user may then call or contact the issuer 18 via a website at step 327. At step 328 the issuer customer service operator (human or robot) may validate the user with previously provisioned security questions. Once the user identity is validated, the user may present the optValue which is confirmed at step 328. An assumption is that a hacker isn't present because the hacker would not have access to the device 12, nor would a hacker be able to pass the security challenge. Since the otpValue is a one-time code, this process is not susceptible to a replay attack. Once the optValue is confirmed at step 328, the issuer 18 may inform the token service 16 of the successful authentication at step 329 so that the binding may be completed.

Figure 5:
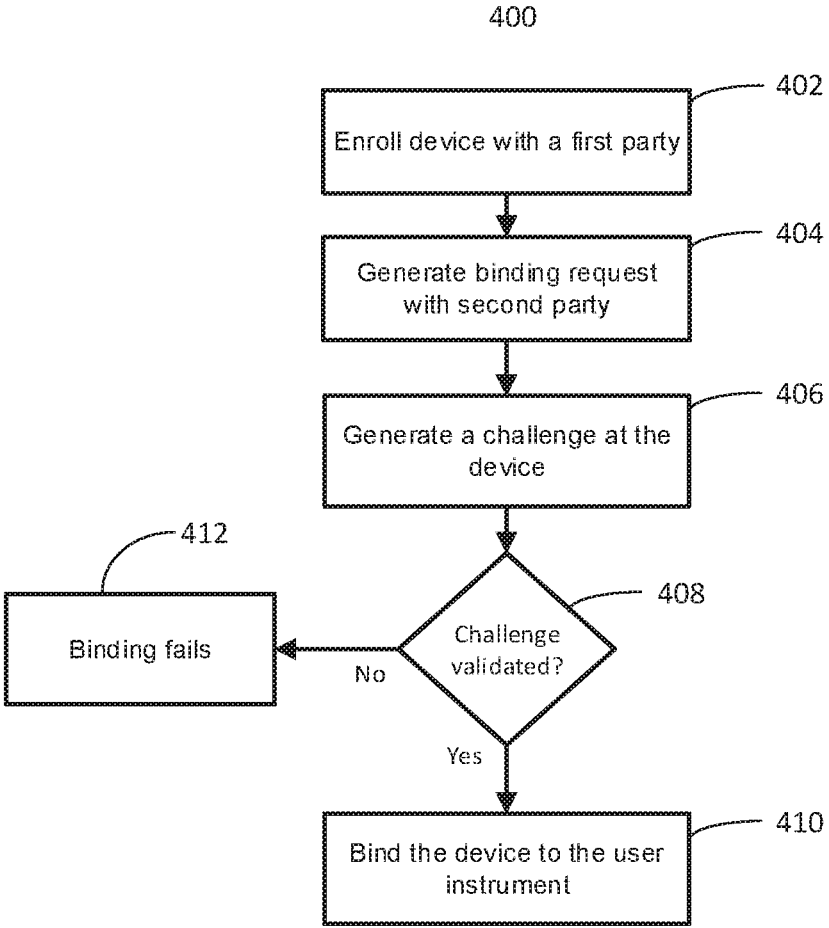
FIG. 5 is flow diagram of a method of performing enhanced consumer device validation.

A method 400 of enhanced consumer device validation is illustrated in FIG. 5. In this method, a financial instrument of the user may be bound to a device of the user. At block 402, a device is enrolled with a first party, for example, a token service 16. At block 404, the enrolled device may generate a request for binding. For example, the binding request may be forwarded to an issuer 18 of a financial instrument, such as a credit card. The issuer 18 may generate a challenge at block 406 that is validated at block 408. If the validation is successful, the device and the selected financial instrument are bound at block 410. If the validation fails, at block 412, the process is halted and no binding is created.

At least one technical effect of the process described above is the layered approach to signatures and encryption to prevent man-in-the-middle attacks and eavesdropping while allowing participants to separately use established trust relationships to build to separate conclusions of the device identity and its control by the user in question which allows the binding to occur. In the various use cases, the out-of-band contact with the user may be presented in different forms with the validation of the challenge occurring in different systems. This creates a significant level of flexibility relative to system availability and involvement for addressing the issue of binding devices.

A system and method in accordance with the current disclosure benefits both users and issuers. Users may bring a virtually unlimited number of unknown devices into use with a minimum level of interaction with other parties. The interaction a user is required to perform is with a party already known and trusted. The above system elements and methods allow the user to establish separate bindings, with separate tokens, for each device he or she owns even though each device (and token) resolve to the same financial instrument, e.g., a credit card. This benefits not only the user 20 but also the issuer 18 by creating separate logical and financial identities for each device a user commissions, reducing the risk of fraud and improving response effectiveness should one of the device's tokens be compromised.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method comprising:

generating, by a wallet application configured on a computing device, an authentication key, wherein the authentication key comprises a public key and a secret key;

sending, by the wallet application, an enrollment request to a service provider for an enrollment request, wherein the enrollment request comprises the authentication key, a personal account number (PAN) associated with a user of the computing device, and a device ID, wherein the device ID corresponds to the computing device;

receiving, by the wallet application, a tokenID from the service provider in response to the enrollment request, wherein the service provider maintains an association between a generated token and the PAN;

sending, by the wallet application, a binding request to the service provider, wherein the binding request binds the computing device through the device ID to the PAN at an issuer via the tokenID;

receiving, by the wallet application, a channel selection request from the service provider in response to a validation of the binding request, wherein the channel selection request is associated with a communication channel for use by the issuer to send a challenge request directly to the computing device;

determining, by the wallet application, a user selection in response to the channel selection request, wherein the user selection is responsive to the channel selection request being provided by the issuer to the computing device;

sending, by the wallet application, a user selection to the service provider, wherein the user selection is validated by the service provider allowing the issuer to respond directly to the computing device;

receiving, by the wallet application, a one-time passcode, wherein the one-time passcode was received by the computing device from the issuer through the communication channel associated with the user selection;

encrypting, by the wallet application, the one-time passcode with the public key to create an encrypted payload;

signing, by the wallet application, the encrypted payload with the device ID to create an encrypted and signed payload; and sending, by the wallet application, the encrypted and signed payload to the service provider, wherein the service provider validates the encrypted and signed payload with the public key and binds the device ID to the token ID.

2. The method of claim 1, further comprising:

generating, by the wallet application, a transport key; and creating, by the wallet application, a certificate with the transport key, the device ID, and the secret key, wherein the certificate is part of the enrollment request.

3. The method of claim 1, within the user identity is associated with personal account number (PAN).

4. The method of claim 1, wherein the binding request comprises a binding request payload with the device ID and the tokenID.

5. The method of claim 4, wherein the binding request payload is signed with the public key.

6. The method of claim 1, wherein the user selection is any one of: email, text message, or out-of-band communication.

7. The method of claim 1, wherein the user selection is an issuer application.

8. The method of claim 7, further comprising:

authenticating the user identity through the issuer application.

9. A non-transitory computer readable medium comprising instructions stored thereon, when executed by a processor of a computing device associated with a user, cause the processor to:

generate an authentication key, wherein the authentication key comprises a public key and a secret key;

send an enrollment request to a service provider, wherein the enrollment request comprises the authentication key, a personal account number (PAN) associated with the user of the computing device, and a device ID, and wherein the device ID corresponds to the computing device;

receive a tokenID from the service provider in response to the enrollment request, wherein the service provider maintains an association between a generated token and the PAN;

send a binding request to the service provider, wherein the binding request binds the computing device through the device ID to the PAN at an issuer via the tokenID;

receive a channel selection request from the service provider in response to a validation of the binding request, wherein the channel selection request is associated with a communication channel for use by the issuer to send a challenge request directly to the computing device;

determine a user selection in response to the channel selection request being provided by the issuer to the computing device, wherein the user selection is an issuer application, and wherein the user selection is validated by the service provider allowing the issuer to respond directly to the computing device;

authenticate the PAN through the issuer application;

receive a one-time passcode, wherein the one-time passcode was received by the computing device from the issuer application;

encrypt the one-time passcode with the public key to create an encrypted payload;

sign the encrypted payload with the device ID to create an encrypted and signed payload; and send the encrypted and signed payload to the service provider, wherein the service provider validates the encrypted and signed payload and binds the device ID to the tokenID.

10. The non-transitory computer readable medium of claim 9, further comprising instructions stored thereon, when executed by the processor, cause the processor to:

generate a transport key; and create a certificate with the transport key, the device ID, and the secret key, wherein the certificate is part of the enrollment request.

11. The non-transitory computer readable medium of claim 9, within the user identity is associated with personal account number (PAN).

12. The non-transitory computer readable medium of claim 9, wherein the binding request comprises a binding request payload with the device ID and the tokenID.

13. The non-transitory computer readable medium of claim 12, wherein the binding request payload is signed with the public key.

14. The non-transitory computer readable medium of claim 9, wherein the user selection is any one of: email, text message, or out-of-band communication.

15. A non-transitory computer readable medium comprising instructions stored thereon, when executed by a processor of a computing device associated with a user, cause the processor to:

generate an authentication key, wherein the authentication key comprises a public key and a secret key;

send an enrollment request to a service provider, wherein the enrollment request comprises the authentication key, a personal account number (PAN) associated with the user of the computing device, and a device ID, and wherein the device ID corresponds to a computing device;

receive a tokenID from the service provider in response to the enrollment request, wherein the service provider maintains an association between a generated token and the PAN;

send a binding request to the service provider, wherein the binding request binds the computing device through the device ID to the PAN at an issuer via the tokenID;

receive a channel selection request from the service provider in response to a validation of the binding request, wherein the channel selection request is associated with a communication channel for use by the issuer to send a challenge request directly to the computing device;

determine a user selection in response to the channel selection request being provided by the issuer to the computing device;

send the user selection to the service provider, wherein the user selection is validated by the service provider allowing the issuer to respond directly to the computing device;

receive a one-time passcode, wherein the one-time passcode was received by the computing device from the issuer through the communication channel associated with the user selection;

encrypt the one-time passcode with the public key to create an encrypted payload;

sign the encrypted payload with the device ID to create an encrypted and signed payload; and send the encrypted and signed payload to the service provider, wherein the service provider validates the encrypted and signed payload and binds the device ID to the tokenID.

16. The non-transitory computer readable medium of claim 15, further comprising instructions stored thereon, when executed by the processor, cause the processor to:

generate a transport key; and create a certificate with the transport key, the device ID, and the secret key, wherein the certificate is part of the enrollment request.

17. The non-transitory computer readable medium of claim 15, wherein the binding request comprises a binding request payload with the device ID and the tokenID.

18. The non-transitory computer readable medium of claim 17, wherein the binding request payload is signed with the public key.

19. The non-transitory computer readable medium of claim 15, wherein the user selection is any one of: email, text message, or out-of-band communication.

20. The non-transitory computer readable medium of claim 15, further comprising instructions stored thereon, when executed by the processor, cause the processor to:

authenticate the user identity through an issuer application, wherein the user selection is the issuer application.

* * * * *